3,563,928
PROMOTER FOR BUILDING TACK IN A HYDROCARBON ELASTOMER

Kenneth Francis King, Wilmington, Del., assignor to E. I. du Pont de Nemours and Company, Wilmington, Del., a corporation of Delaware
No Drawing. Filed July 1, 1969, Ser. No. 838,358
Int. Cl. C08f 29/12
U.S. Cl. 260—19      11 Claims

ABSTRACT OF THE DISCLOSURE

In an EPDM elastomer tackified by (a) adding a polar organic cyclic resin, (b) aging the resulting mixture and (c) exposing the surface to an activating agent, tack formation is promoted by compounding the elastomer with an oil-soluble, organic salt of a transition metal. Alternatively, tack can be developed on the surface of an EPDM elastomer by (a) coating the surface with a cement made by mixing an EPDM elastomer, a polar organic cyclic resin and an oil-soluble organic salt of a transition metal, in a solvent, (b) drying the cement and (c) exposing the coated surface to an activating agent.

BACKGROUND OF THE INVENTION

This invention relates to the art of compounding EPDM elastomers and, more particularly, to the art of promoting building tack in EPDM elastomers. The term "building tack" (sometimes referred to simply as "tack") is used herein with its usual meaning as the peculiar characteristic of natural rubber which causes two fresh surfaces to adhere or coalesce when brought into contact under moderate pressure. Tackified elastomers are required in manufacturing multilayered elastomeric products such as belts, hoses, tires and reservoir liners.

EPDM elastomers are notably deficient in building tack. It is known, however, that EPDM elastomers can be tackified by mixing the elastomer with a polar organic cyclic resin, aging the resulting mixture in the substantial absence of ozone and free radical producing agents until a phase different from the bulk of the mixture forms on a surface of the mixture followed by exposing said surface to a special activating agent such as ozone or a free radical producing agent such as ultraviolet light. It is desirable to improve this process by providing a compound to promote the formation of building tack in an EPDM elastomer and to add versatility to the process by providing a cement, made to include a tackifier and a promoter, that can impart building tack to the surface of an EPDM elastomer when coated thereon. Furthermore, it is desirable to eliminate the need for special activating agents and provide a process where surface activation can be accomplished by aerating the cement before or after application.

SUMMARY OF THE INVENTION

Accordingly, this invention provides a building tack promoter for EPDM elastomers tackified by compounding the elastomer with a polar organic cyclic resin. The promoter is an oil-soluble, organic salt of a transition metal, added as a compounding ingredient. The new product is a conventional EPDM elastomer tackified by:
(a) uniformly mixing the elastomer with an organo cyclic resin having at least one polar functional group and a molecular weight of at least 200;

(b) aging the mixture in the substantial absence of an activating agent until a phase, different from the bulk of the mixture, forms on the surface of the mixture; and
(c) exposing said surface to an activating agent to produce a peel tack which is at least one pound per linear inch more than the peel tack before exposure;

with the improvement of additionally compounding the elastomer with an oil-soluble, organic salt of a transition metal, to promote the formation of building tack. Useful organic salts include naphthenates, linoleates, resinates, and octoates of the transition metals including manganese, iron, cobalt, nickel or copper. The promoter permits the use of air as an activator.

Alternatively, the building tack of a surface of an EPDM elastomer is increased by coating the surface with a cement made by (a) mixing in a solvent, an EPDM elastomer, preferably of the same composition as the elastomer to be coated, a polar organic cyclic resin having a molecular weight of at least 200 and an oil-soluble, organic salt of a transition metal, (b) drying the coated cement and (c) exposing the coated surface to an activating agent. In still another embodiment, the cement can be activated by being aerated before it is coated. Thereafter, the building tack of a surface of an EPDM elastomer can be increased by coating the surface with the aerated cement, then drying the coated surface.

DETAILS OF THE INVENTION

The building tack promoters useful in compounding EPDM elastomers according to this invention are oil-insoluble, organic salts of a transition metal.

The promoter is incorporated into the EPDM elastomer in an amount of about 0.5 to 10 parts per 100 parts by weight of elastomer. It is desirable to use as little salt as will promote the desired tack for economic reasons and to avoid possible adverse effects on certain elastomer during curing or oxygen degradation of the elastomer in a cured state. A preferred range is 0.5 to 5 parts.

This invention is useful for promoting building tack in ethylene/propylene/diene copolymers (EPDM), the diene having only one polymerizable double bond in the sense that only one double bond of the diene reacts to a substantial degree in forming the polymer backbone of the EPDM copolymer prepared by conventional procedures. Examples of such dienes are open-chain or cyclic compounds. The open-chain dienes have the general formula:

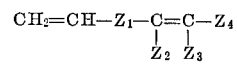

where $Z_1$ is $C_1$–$C_8$ alkylene and $Z_2$, $Z_3$ and $Z_4$ are independently hydrogen or an alkyl radical and the Z groups are chosen such that the diene has from about 6–22 carbon atoms. Representative open-chain dienes are 1,4-hexadiene, which is preferred because of the outstanding physical properties of the resulting copolymer; 1,4-heptadiene; 1,5-heptadiene; 6-methyl-1,5-heptadiene, etc. Cyclic dienes include dicyclopentadiene; 5-methylene - 2 - norbornene; 5-ethylidene-2-norbornene; 5-(2′-butenyl)-norbornene and 5-ethyl-2,5-norbornadiene.

Representative copolymers made from the above-described monomers and methods for their preparation are given in U.S. Pats. 3,093,620; 3,063,973; and 2,933,480.

The organic cyclic resins useful in this invention as tackifiers are, in general, isoprenoid resins, terpenoid resins or heat-insensitive phenol-aldehyde resins. The cyclic resins useful in this invention have a molecular weight of at least about 200 and contain at least one polar functional group. The latter can be attached directly to a chain carbon or an alicyclic carbon atom or be part of a ring. Representative polar functional groups include an ethylenically unsaturated group (C=C), hydroxyl (—OH), ester (—COOR), carboxy (—COOH), amide (—CONH$_2$), amine (—NH$_2$), cyano (—CN), mercapto (—SH), aldehyde (—CHO), oxo (=O), carbonyl (O=C=), and the like. The cyclic resins include condensation products such as phenolaldehyde resins and compounds with polycyclic rings as in abietic acid and derivatives thereof. R is aliphatic or aromatic.

The terpenoid resins useful in this invention include terpenes, rosins, modified rosins and derivatives of these which meet the criteria set forth above. The class includes hydrogenated and partially hydrogenated rosins, aromatized and polymerized rosins and derivatives thereof, containing one or more of a combination of the polar functional groups mentioned above. In such compounds the normal functional groups can be replaced with one of the functional polar groups mentioned above (e.g., abietic acid in which the carboxy group is substituted by a hydroxyl group). Resin acids which are useful tackifiers include abietic acid, neoabietic acid, dehydroabietic acid, dihydroabietic acid, tetrahydroabietic acid, levo pimaric acid, dextro pimaric acid and isodextro pimaric acid. Dimers and derivatives of these acids containing one or more of the above function groups, particularly the esters, can also be used.

The isoprenoid compounds useful in this invention include resinous polymers such as the Diels-Alder reaction product of isoprene with piperylene, butadiene, dicyclopentadiene or combinations thereof, the polymerization being conducted with an acid catalyst. Such polymers modified by introduction of one or more of the abovementioned polar functional groups are preferred and carboxylated, hydroxylated and phenolated derivatives of such polymers are especially preferred. Commercial polymers which can be so modified include "Wing-tack 95" and "Betaprene," sold by Goodyear Tire and Rubber Company and Reichhold Chemical Company, respectively. Although phenol aldehyde resins generally are useful, phenol formaldehyde resins meeting the above criteria are particularly preferred. The phenol aldehye resins are heat-insensitive in that they are stable to change under the conditions of incorporation in the elastomer and its ultimate use.

An especially useful isoprenoid resin is an interaddition polymer of an isoprenoidal codimer, as exemplified by an interdimer of isoprene and allylically terminated cyclopentadiene, wherein the isoprenoidal codimer is about 50–90% of the final copolymer by reason of reaction (termination with 2-methylbutene or α-methyl-styrene in an amount of at least equal to the amount of cyclodienes present).

The isoprenoid resins are preferably prepared by mixing two commercial by-product streams, A and B, each containing a mixture of olefins and diolefins.

Stream A is a by-product from the cracking of natural gas, propane, butane or naphtha, the cracking being primarily aimed at the production of ethylene and propylene. This byproduct stream is debutenized, dearomatized and fractionally distilled to provide a mixture of predominantly aliphatic C$_5$ olefins which is used in this invention. A typical analysis appears below.

Stream B is a mixture of C$_5$ olefins and diolefins which is a by-product in the production of isoprene from propylene or isoamylene. This stream will normally contain a substantial amount of 2-methyl butene-2, as shown in the typical analysis below.

The two streams, A and B, are mixed in proportions so that the 2-methyl butene-2 will be at a concentration equal to that of the cyclodienes present and it is this mixture which is polymerized with an acid catalyst. The piperylenes referred to in the specification, of course, refer to the trans- and cis-pentadiene. The primary resin formers in the system are the trans- and cis-pentadienes, isoprene and cyclopentadiene. α-Methyl styrene may be present in place of 2-methyl butene-2 to provide allylic termination for the cyclodienes.

| Stream A: | Percent |
|---|---|
| Butene-1 | 5.9 |
| Butene-2 | 2.8 |
| 1,4-pentadiene | 6.8 |
| Pentene-1 | 5.0 |
| Pentene-2 | 0.4 |
| Isoprene | 17.1 |
| Trans-1,3-pentadiene | 12.1 |
| Cyclopentadiene | 27.4 |
| 2-methyl-butene-2 | 0.8 |
| Cis-1,3-pentadiene | 7.6 |
| Saturates | 12.8 |
| Stream B: | |
| Trans-pentene-2 | 6.96 |
| Cis-pentene-2 | 3.09 |
| 2-methyl butene-2 | 35.8 |
| Isoprene | 6.9 |
| 2-methyl pentene-1 | 2.3 |
| 2-methyl pentene-2 | 0.1 |
| Piperylene | 36.3 |
| Cyclopentadiene | 0.84 |

The resin tackifiers useful in this invention are incorporated into the polymers in amount of about 1–50 phr. (parts tackifier per hundred parts polymer by weight) and preferably in an amount of 1–10 phr. It is desirable to use as little tackifier as will provide the desired tack for economic reasons and to avoid adverse effects on curability of the polymer.

The compositions of the present invention are made by mixing the elastomer, cyclic resin and transition metal organic salt in any convenient manner which will provide a uniform mixture. This can be accomplished by milling on a conventional rubber mill or mixing in an internal mixer such as a Banbury mixer. Conveniently, the cyclic resin and organic salt can be added to the polymer during the routine compounding operation wherein one or more other additives such as curing agents, antioxidants, pigments, etc., are added. The latter are not necessary to gain the advantages of this invention. Curing is effected by conventional means.

Following mixing, it is essential that the mixture be aged. Aging is preferably effected by simply storing the mixture in a place where it is exposed to minimal ultraviolet light or other free-radical producing agents (e.g., in a dark room) for a few minutes. The minimum aging period necessary for acceptable tack will vary with the particular polymer, tackifier, other additive present, particularly oils, temperature, etc. Aging is conducted for a period long enough to permit the formation of a separate phase on the surface of the mixture. This separate phase can be seen under a microscope when the elastomer does not contain a filler obscuring it.

The appearance of a phase separation can be detected by total reflectance infrared spectroscopy which will show a change in proportions of the mixture components in local areas for example, at or near the surface of the elastomer as compared to the interior. In some instances, aging occurs practically instantaneously or during the mixing operation so that activation can be effected immediately after mixing.

After aging, a surface of the elastomer is exposed to an activating agent resulting in the formation of building tack on the exposed surface. The use of the promoter makes it possible to use air as an activating agent. Air is blown by conventional means against the surface to be activated and the amount of air used is measured in terms of air flow rate (volume of air/unit of time). The air flow rate required varies with the type and concentration of tackifier and promoter present. In general, the air flow rate required is inversely proportional to the concentration of tackifier and promoter present and directly proportional to the surface area. The correct air flow rate for a particular situation can easily be determined by trial testing.

Alternatively, activating agents known to the art that can be used are ozone or ultraviolet light in the presence of oxygen. Free radical producing agents such as spark discharge, flame treatment, etc. can also be used. Preferably, the agent is used in a manner which will provide only surface treatment of the elastomer.

Too much exposure to an activating agent can adversely affect tack and can even reduce the tack inherent in the elastomer itself. Too little exposure prolongs the time necessary to impart the desired tack. The time of exposure varies inversely with the intensity of the treatment. Care is advisable because an excessive exposure period can destroy the tack initially produced by an otherwise acceptable exposure. The correct exposure for a particular stock can easily be determined by trial tests.

Although the chemical reason for the effectiveness of this invention is not entirely understood, it is believed that the aging of the elastomer permits the resin tackifier and promoter in the interior of the elastomer to "bloom," that is, to at least partially migrate to the surface. The resin tackifier and promoter, therefore, must be materials which are sufficiently soluble in the elastomer to permit this migration during the aging period and are present in the elastomer in a concentration which exceeds its solubility product therein. The faster the migration the shorter the aging period can be and in some cases no aging time or practically none is necessary. The more migration occurs the longer the tack will be retained.

An alternate embodiment of this invention for imparting building tack to an α-olefin hydrocarbon elastomer involves (a) coating the elastomer with a cement incorporating an EPDM elastomer, a polar organic cyclic resin having a molecular weight of at least 200 and an oil-soluble organic salt of a transition metal;
(b) drying the coated cement; and
(c) exposing the coated surface to an activating agent.

The cement can be prepared by mixing a 5 to 25 weight percent solids solution of (a) an elastomer, (b) 1 to 100 weight percent of a polar organic cyclic resin per 100 parts of elastomer having a molecular weight of at least 200 and (c) 1 to 10 weight percent of an oil-soluble organic salt of a transition metal per 100 parts of elastomer. The elastomeric hydrocarbon is preferably an EPDM of the same composition as the elastomer to be coated. The polar organic cyclic resin and the organic salt of a transition metal are the same as those described above. The solution is in a solvent such as Chlorothene (a chlorinated organic solvent) or hexane.

The cement is coated onto an elastomer surface by conventional coating techniques such as painting, spraying or dip coating at a coating thickness of about 10 to 25 milligrams per sq. in. After coating, the cement is dried to evaporate the solvent and then exposed to an activating agent as described above.

It has also been found that building tack can be effected by aerating the cement before it is supplied. For example, when air is "bubbled through" the cement solution and the cement later coated onto an elastomer then dried, good building tack results.

This alternate embodiment of imparting tack by the use of a cement is affected by relative humidity; therefore, it is suggested that the relative humidity at the elastomer surface to be coated be maintained between 20 and 40% during coating, drying and activating, for the most effective results.

Regardless of whether the promoter is incorporated into the elastomer-cyclic resin mix or incorporated into a cement of elastomer/cyclic resin, the period and intensity of exposure to the activating agent is regulated to provide at least one pound per linear inch of peel tack more than the peel tack of the elastomer without activation.

The following examples illustrate the invention. All parts, percentages and proportions are by weight unless otherwise indicated.

The base elastomer formula is as follows:

FORMULA A

| | |
|---|---|
| EPDM-A | 100 |
| HAF carbon black | 80 |
| Petroleum oil (Flexon 765) | 40 |
| Zinc oxide | 5 |
| Sulfur (Crystex-90®) | 1.5 |
| 2-mercaptobenzothiazole | 0.75 |
| Tetramethyl thiuram disulfide | 0.5 |
| Zinc dimethyldithiocarbamate | 2.0 |
| N-nitroso-diphenylamine | 1.0 |

EPDM-A copolymer, used in the examples, is made in accordance with the general procedure of U.S. Pat. 2,933,480. Ethylene, propylene and 1,4-hexadiene are incorporated in the weight proportions of 52.4/44/3.6, respectively, by polymerization in solution in tetrachloroethylene and in the presence of a preformed coordination catalyst made by mixing vanadium oxytrichloride with diisobutyl aluminum monochloride. The copolymer has a Mooney viscosity (ML1+4/250° F.) of about 70. The degree of unsaturation is about 0.3 g.-mol of ethylenic C=C per kilogram. The materials are compounded on a conventional rubber mill or in a Banbury mixer using conventional techniques. All parts are by weight.

Cement #1

Cement #1 used in the examples below is prepared according to the following base formula:

| | |
|---|---|
| EPDM-A | 100 |
| ISAF-10F carbon black [1] | 77.8 |
| Petroleum oil (Flexon 765) | 39.7 |
| Hexane | 1595 |

[1] Dry weight of carbon black is 70; ISAF-10F contains 90 parts ISAF carbon black and 10 parts Flexon 765.

Calendered carcass fabric stock

An automobile tire skim stock is compounded according to the following recipe:

| | Phr. |
|---|---|
| EPDM-A | 100 |
| HAF carbon black | 80 |
| Paraffinic oil (Sunpar 2280) | 45 |
| Wing-tack 95 | 5 |
| Sulfur (Crystex-90) | 1.5 |
| Tetramethyl thiuram disulfide | 0.75 |
| 2-mercaptobenzothiazole | 1 |
| 2,2'-dithiobisbenzothiazole | 1 |
| Zinc dimethyldithiocarbamate | 1.5 |
| N-nitrosodiphenylamine | 1 |
| Zinc oxide | 5 |
| Stearic acid | 1 |

This skim stock is calendered on 180° F. rollers with 2-plied nylon carcass fabric which has been coated with an adhesive made from resorcinol/formaldehyde resin and chlorosulfonated polyethylene.

Tackifiers

The following tackifiers are used in the examples: "Wing-tack 95"—Goodyear Tire & Rubber Co.—Polymerized product from the condensation intermediate of isoprene and piperylene. It has a molecular weight of about 1500–2090 and unsaturation corresponding to about 1 to 2 g.-mols of ethylenic groups per kilogram.

100% hydroxylated "Wing-tack 95."—A solution of 200 grams of "Wing-tack 95," in 1500 ml. of heptane is treated under nitrogen over a 60-minute period by addition of 60 ml. of a one molar tetrahydrofuran solution in $BH_3$. After two hours reflux, it is cooled to about 60° C. and 40 ml. more of the $BH_3$ solution is added. The mixture is heated and kept at reflux for another 30 minutes. Slowly, 100 ml. 3 N NaOH is added, followed by 100 ml. 30% $H_2O_2$; each reaction is exothermic. When refluxing subsides, the solution is stirred until it cools to room temperature and then washed well with water and concentrated by evaporation in a pan. The IR shows a strong peak at 3.0 microns (OH band) and the C=C bond at 10.37 has become negligible.

"Betaprene H–100"—Reichhold Chemical Co.—"Betaprene H–100" is the reaction product formed by (1) adjusting the olefin-containing by-product of a hydrocarbon cracking process so that it contains about 6% by weight of each of 2-methyl-2-butene and dicyclopentadiene with the remainder characterized by substantially equal weight proportions of isoprene and piperylene and (2) heating the mixture at about 70–80° C. in the presence of $AlCl_3$ until the reaction is substantially completed. Betaprene H–100 has the following properties: melting point (ball and ring), 100° C.; specific gravity, 0.95; acid and saponification numbers each less than 1.0; iodine number, about 98; molecular weight, about 1400.

100% hydroxylated "Betaprene H–100."—Hydroxylated "Betaprene H–100" is made by substituting "Betaprene H–100" for "Wing-tack 95" in the procedure for 100% hydroxylated "Wing-tack 95."

"Flexon 765"—Humble Oil & Refining Co.—This naphthenic petroleum oil has a viscosity-gravity constant of about 0.898, a specific gravity (60/60° F.) of 0.8980, a Saybolt viscosity (210° F.) of 58 sec., and a flash point of 445° F.

"Sunpar 2280"—Sun Oil Co.—This paraffinic petroleum oil has a viscosity-gravity constant of about 0.796, a specific gravity (60/60° F.) of 0.8916, a Saybolt viscosity (210° F.) of 165 sec. and a flash point of 595° F.

Cyclic resin ZXRP 3536—Union Carbide Company. The following tests are used to determine the amount of tack in the elastomer illustrated in the examples.

Peel tack.—Test samples are formed by pressing a 6 x 3 x 0.75-inch sheet of elastomeric material between a cotton duck backing and a polyethylene terephthalate film, to embed the cotton duck in one face, using a laboratory compression molding press, with mild pressure at a temperature of 100° C. for 3 minutes. Test strips ¼-inch wide are cut from the backed sheet, the film is removed, and pairs are joined by placing the elastomeric surfaces together and rolling with an 8-pound weight. Thirty seconds after joining the strips they are pulled apart in a tensile testing machine at a draw rate of 2.5 inches per minute at 25° C. (68° F.). The peel strength is recorded in pound per linear inch.

Tensile tack.—A second method of measuring tack is designed to measure the tack bond in tensile loading. Specimens are cut from either (a) the carcass fabric in 1" x ½" strips with the cords parallel to the long axis or (b) from fabric constructed as described under the Peel Test. One piece is mounted vertically on the face of a fixed metal block. The other piece is mounted horizontally across a similar block which can be driven into contact with the first block by an air activated cylinder. When the faces of the pieces are contacted, the contact force is measured by the pressure applied to the air cylinder. A contact force of 20 lbs. is used. The time of contact is determined by a timing mechanism which can be set for an interval of 0.8 to 15 seconds. A contact time of one second is used followed by application of a 5-lb. breaking force. The time at which the surfaces separate is recorded up to a maximum of 600 seconds as a measure of the degree of tensile tack.

EXAMPLE 1

An elastomeric composition is prepared in accordance with Formula A plus 10 parts of hydroxylated "Wing-tack 95" and 6 parts of manganese naphthenate per 100 parts of EPDM-A. The materials are compounded on a rubber rubber mill using conventional techniques then sheeted out. Stock samples are cut and stored for 12 hours in the dark. This surface is then exposed to ultraviolet light from a mercury vapor lamp in the presence of air.

For comparison, Control Sample A is prepared in the sammer manner as Example 1, except that the manganese naphthate is omitted.

Table I below gives the results of the Peel Tack and Tensile Tack tests. Example 1 achieves maximum results in peel tack and tensile tack between 5 and 10 seconds after exposure, whereas Control Sample A shows no significant improvement in peel tack or tensile tack after 10 seconds of exposure time.

TABLE I

|  | U.V. exposure (sec.) | Peel tack (p.l.i.) | Tensile tack (sec.) |
|---|---|---|---|
| Example 1 | 0 | 0.9 | 2.5 |
|  | 5 | 2.2 | 390 |
|  | 10 | ¹10.6 | 600 |
| Control sample A | 0 | 0.3 | 0.3 |
|  | 10 | 0.5 | 0.3 |

¹ Weld.

EXAMPLE 2

Example 1 is repeated except that two samples are prepared and each surface is activated by exposure to an air flow rate of 8 liters per minute and 43 liters per minute, respectively.

For comparison, Control Sample B is prepared in the same manner as Example 1 wherein two samples are prepared except that manganese naphthenate is omitted and the surface of each is activated by exposure to air flow rates of 8 liters per minute and 43 liters per minute, respectively.

Table II below gives the results of testing.

TABLE II

| | Air Flow (l./min.) | Exposure period (min.) | Air flow relative humidity percent | Peel tack (p.l.i.) | Tensile tack (sec.) |
|---|---|---|---|---|---|
| Example 2 | 8 | ¹45 | 21 | 1.0 | 7.2 |
|  |  | ¹60 | 21 | 1.8 | 9.9 |
|  |  | ¹75 | 21 | 1.6 | 8.0 |
|  |  | ¹105 | 21 | 3.5 | >600 |
|  |  | ¹150 | 23 | ²11.5 | >600 |
|  | 43 | ¹30 | 27 | 1.6 | 13 |
|  |  | ¹45 | 27 | 1.6 | 70 |
|  |  | ¹60 | 27 | ²9.7 | >600 |
|  |  | ¹75 | 26 | ²12.4 | >600 |
| Control sample B | 8 | 150 | 26 | 0.3 | 0.3 |
|  |  | 465 | 21 | 0.5 | 1.0 |
|  |  | 900 | 20 | 1.6 | 4.5 |
|  |  | 1,470 | 20 | 5.3 | 177 |
|  | 43 | 45 | 27 | 0.5 | 0.6 |
|  |  | 75 | 26 | 0.4 | 0.5 |
|  |  | 315 | 23 | 0.5 | 1.5 |
|  |  | 495 | 21 | 0.7 | 3.3 |
|  |  | 900 | 20 | 3.5 | 26 |
|  |  | 1,470 | 20 | 8.4 | 385 |

¹ Aging 2–3 hours.
² Weld.

At air flow rates of 8 and 43 liters per minute, maximum tack developed in 150 minutes and 75 minutes, respectively, in the test pieces made from the composition of Example 2, whereas, in the test pieces of Control Sample B peel tack is never enough to form a weld and the tensile tack does not reach a maximum.

EXAMPLE 3

A calendered carcass fabric prepared in accordance with the procedure described above, is coated in an environment having a relative humidity of 26%, with Cement #1 formulation containing 30 phr. of "Wing-tack 95" and 6 phr. manganese naphthenate supplied in hexane with 12 weight percent solids. The coated sheets were dried for 24 hours in the dark and the cement surface then exposed to an air flow of 20 liters per minute in the dark.

Control Sample C was prepared in the same manner as Example 3 except that manganese naphthenate was omitted from the cement composition.

Table III below gives the comparative results of testing the compositions of Example 3 and Control Sample C.

TABLE III

|  | Exposure period to air (min.) | Relative humidity of air (percent) | Peel tack p.l.i.) | Tensile tack |
|---|---|---|---|---|
| Example 3 | 180 | 33 | 8.8 | 2.3 |
|  | 240 | 33 | 8.8 | 490 |
|  | 305 | 33 | 9.7 | 600 |
| Sample C | 180 | 33 | 0 | 0.5 |
|  | 360 | 33 | 0 | 0.6 |
|  | 1,420 | 29 | 0.2 | 1.4 |

The cement containing manganese naphthenate exhibits nearly maximum tack properties between 240 and 305 minutes, whereas, the cement of Control Sample C exhibits little tack bond formation up to 1420 minutes.

EXAMPLE 4

A coating composition having 12 weight percent solids is prepared from Cement #1 with the addition of 30 phr. of "Betaprene H-100," hexane, and 6 phr. manganese naphthenate. Sheets of calendered carcass fabric prepared as described above are coated with this composition at 19% relative humidity. After the coated sheets have been dried for 24 hours, the cement surfaces are exposed to an air flow of 20 liters per minute at about 25% relative humidity.

Control Sample D is prepared in the same manner as Example 3 except manganese naphthenate is omitted from the coating composition.

Table IV below gives the comparative results of testing the compositions of Example 4 and Control Sample D. The cement containing manganese naphthenate exhibits nearly maximum tack properties after an exposure to air lasting between 120 and 140 minutes, whereas, the cements of Control Sample D exhibit little tack bond strength formation up to 200 minutes exposure of air flow.

TABLE IV

|  | Exposure time (min.) | Peel tack p.l.i.) | Tensile tack (sec.) |
|---|---|---|---|
| Example 4 | 60 | 9.5 | 12 |
|  | 90 | 9.4 | 37 |
|  | 120 | 10.5 | 125 |
|  | 140 | (¹) | >600 |
| Control sample D | 65 | 7 | Nil |
|  | 120 | 10.5 | 25 |
|  | 180 | (¹) | 225 |
|  | 200 | (¹) | 200 |

¹ Not determined.

EXAMPLES 5, 6, 7, 8

Coating compositions having 12 weight percent solids prepared from Cement #1 by adding with the addition of 30 phr. of tackifier resin (hydroxylated "Betaprene H-100" in Examples 5 and 7 and "ZXRP-3536" in Examples 6 and 8), hexane, and 6 phr. of manganese naphthenate. Sheets of calendered carcass fabric are coated with these compositions at 26% relative humidity, then dried for at least 17 hours. In Examples 5 and 7 the coated surfaces are exposed to fluorescent light. In Examples 6 and 8 the coated surfaces are exposed to air at a flow rate of 20 liters per minute with the relative humidity of the air between 32-34%.

Control Samples E, F, G and H are prepared in the same manner as Examples 5, 6, 7 and 8, respectively, except that manganese naphthenate is omitted from the cement.

Table V below gives the results of the testing.

TABLE V¹

| Fluorescent Light | 0 | 30 | 60 | 90 | 120 | 150 | 180 | 210 |
|---|---|---|---|---|---|---|---|---|
| Ex. 5 peel tack | 0.7 | 1.0 | 1.6 | 2.5 | 8.0 | 9.5 | (²) | ---- |
| Control Sample E peel tack | 0 | 0.1 | 1.2 | 0.3 | 0.4 | 0.5 | 0.9 | 1.3 |
| Ex. 5 tensile tack | 10 | 10 | 10 | 10 | 25 | 600 |  |  |
| Control Sample E tensile tack | 10 | 10 | 10 | 10 | 10 | 10 | 10 | ---- |
| Ex. 6 peel tack | 0.6 | 1.0 | 1.4 | 4.4 | 8.1 | 9.6 | (²) | ---- |
| Control Sample F peel tack | 0.5 | 0.5 | 0.5 | 0.6 | 4.3 | 7.0 | 10 | (²) |
| Ex. 6 tensile tack | 0 | 0 | 10 | 260 | 600 |  |  |  |
| Control Sample F tensile tack | 0 | 0 | 0 | 0 | 0 | 25 | 150 | 300 |

Continuous air flow 20 liters per minute

| Ex. 7 peel tack | .7 | 1.4 | 5.3 | 10.4 | (²) |  |  |  |
| Control Sample G peel tack | .2 | .2 | .2 | .2 | .3 | .5 | 3.2 | ²10 |
| Ex. 7 tensile tack | 0 | 0 | 25 | 600 |  |  |  |  |
| Control Sample G tensile tack | 0 | 0 | 0 | 10 | 20 | 25 | 25 | 25 |
| Ex. 8 peel tack | 0 | 9.6 | (²) |  |  |  |  |  |
| Control Sample H peel tack | 0 | .2 | .6 | 2.2 | 4.5 | 9.5 | (²) | ---- |
| Ex. 8 tensile tack | 0 | 25 | 600 |  |  |  |  |  |
| Control Sample H tensile tack | 0 | 0 | 0 | 0 | 0 | 0 | ------- |  |

¹ Peel tack in p.l.i. Tensile tack in sec.
² Weld.

EXAMPLES 9, 10 AND 11

Coating compositions having 12 weight percent solids are prepared from Cement #1 with the addition of 30 phr. of hydroxylated "Wing-tack 95" hexane, and 6 phr. of a promoter, Cobalt naphthenate in Example 9, iron naphthenate in Example 10, and copper naphthenate in Example 11. Calendered carcass fabric is coated at 46% relative humidity with these compositions, then dried for at least 17 hours. Finally the coated surfaces are exposed to air at a flow rate of 8 liters per minute with the relative humidity of the air between 20-40%.

Control Sample I is prepared in the same manner as Examples 9-11 except that the transition metal salt promoter is omitted from the cement.

Table VI below gives the results of the testing.

TABLE VI*

|  | Control Sample I | | Example 9, cobalt naphthenate | | Example 10, iron naphthenate | | Example 11, copper napthhenate | |
|---|---|---|---|---|---|---|---|---|
|  | Peel tack | Tensile tack | Peel tack | Tensile tack | Peel tack | Tensile tack | Peel tack | Tensile tack |
| Exposure time (min.): |  |  |  |  |  |  |  |  |
| 0 | .5 | 0 | .5 | 0 | .5 | 0 | .4 | 10 |
| 30 | .5 | 0 | 10 | 600 | 2 | 10 | .7 | 10 |
| 60 | .5 | 0 |  |  | 3 | 25 | 1.2 | 10 |
| 90 | .5 | 0 |  |  | 10 | 300 | 1.5 | 15 |
| 120 | .5 | 0 |  |  |  | 375 | 2.0 | 15 |
| 150 | .5 | 0 |  |  |  | 600 | 3.0 | 25 |
| 180 | .5 | 0 |  |  |  |  | 3.5 | 50 |
| 210 | .5 | 0 |  |  |  |  | 10 | 50 |
| 240 | .5 | 0 |  |  |  |  |  | 400 |
| 360 | 3.5 | 0 |  |  |  |  |  |  |
| 440 | 10 | 0 |  |  |  |  |  |  |

* Peel tack in p.l.i.; tensile tack in sec.

EXAMPLES 12 AND 13

A coating composition is prepared from Cement #1 with the addition of 30 phr. of "Wing-tack 95," hexane, and 6 phr. of a promoter (manganese linoleate in Example 12 and manganese resinate in Example 13. Sheets of calendered carcass fabric are coated with these compositions, at 20% relative humidity, then dried for at least 17 hours. Finally the coated surfaces are exposed to ultraviolet light with the relative humidity of the exposure environment about 30%. Air is present.

Control Sample J is prepared in the same manner as the assemblies in Examples 12 and 13 except that a transitional metal salt is omitted from the cement.

Table VII below gives the results of testing.

TABLE VII

| Time of exposure (min.): | Example 12 (Manganese linoleate) peel tack (p.l.i.) | Example 13 (Manganese resinate) peel tack (p.l.i.) | Control Sample J peel tack (p.l.i.) |
|---|---|---|---|
| 0 | .2 | .2 | .2 |
| 30 | .7 | 1.7 | .2 |
| 60 | 1.8 | 3.5 | .3 |
| 90 | 3.5 | 8.0 | 1.0 |
| 120 | ¹10 | ¹10 | 1.2 |
| 150 |  |  | 2.0 |
| 180 |  |  | 3.0 |
| 240 |  |  | 8.0 |

¹ Weld.

EXAMPLE 14

A tire is made in a conventional manner except that the cement used between the carcass fabric and the tread is made according to the present invention. A calendered fabric is positioned on a tire-building drum. Beads are set and ply ends turned up. The surface of the tread which addresses the carcass fabric is coated with a cement of this invention described below. Chafer strips and the treated tread are attached. The tire-building drum is collapsed and the green tire transferred to a conventional tire mold. The tire is then cured in the mold.

The carcass fabric is the same as that described above. The tread is prepared in a conventional manner by extruding a composition comprising:

| | Parts |
|---|---|
| EPDM-B | 75 |
| EPDM-C | 25 |
| Carbon black (Vulcan 3H) | 80 |
| Paraffinic oil (Sunpar 150) | 50 |
| Zinc oxide | 5 |
| Stearic acid | 1 |
| Sulfur (Crystex 90) | 1.25 |
| 2,2'-dithiobisbenzothiazole | 1.5 |
| N-nitrosodiphenylamine | 3 |

EPDM-B is a copolymer of ethylene/propylene/1,4-hexadiene units (53.5/40/6.5 wt. proportions) prepared by copolymerization in tetrachloroethylene in the presence of preformed coordination catalyst prepared by mixing $VOCl_3$ and diisobutylaluminum monochloride in accordance with the general procedures of U.S. Pat. 2,933,480. The copolymer has a Mooney (ML-4/250° F.) viscosity of 70 and about 0.6 gram-mol of ethylenic unsaturation/kg.

EPDM-C is a copolymer of ethylene/propylene/1,4-hexadiene units (59/36/5 weight proportions) prepared by copolymerization in tetrachloroethylene in the presence of a coordination catalyst made in situ by combining $VCl_4$ and diisobutylaluminum monochloride in accordance with the general procedures of U.S. Pat. 2,933,480; hydrogen modification is used in accordance with U.S. Pat. 3,051,690. The copolymer has a Mooney (ML-4/250° F.) viscosity of 40.

The cement is prepared by mill mixing the composition given below, dispersing the resulting mixed composition in hexane, adding 35 phr. more "Betaprene H-100," and adjusting the solids content to a value of 14 weight percent.

TABLE VII

| | Parts |
|---|---|
| EPDM-B | 100 |
| SAF black | 90 |
| Zinc oxide | 5 |
| Paraffinic oil | 15 |
| Isoprenoidal resin ("Betaprene H-100") | 40 |
| Zinc dimethyldithiocarbamate | 1 |
| Tetramethyl thiuram disulfide | 1 |
| 2,2'-dithiobisbenzothiazole | 0.8 |
| Sulfur | 2 |
| Manganese naphthenate | 3 |

The cement is aerated in the following manner. A ¼-inch diameter glass tube is inserted in a reservoir containing 5 gallons of the cement. Air is forced through the glass tube and into the cement at a rate of about 1300 cc./min. for about 20 minutes.

In application, the cement is painted on the underside of the extruded tread and is allowed to dry for about 20 to 30 seconds. The coating is covered with a cotton liner and the tread stored for 16 hours at room temperature. Optionally the coated tread can be used immediately after drying or the coating can be covered with a cotton liner and the tread stored until needed.

When the coated tread is placed on a carcass fabric which is positioned on the building drum, the tread has adequate tack and remains in place without the splice opening. The green tire is cured for 20 minutes at 174° C. in a tire press such as a "Bag-O-Matic" press. After curing, the tire is tested by a step loading test where the tire is mounted on a rim, inflated and rotated under a friction load bearing against the tire.

Tires prepared by incorporating the aerated cement as described above, were tested until the tire failed by a dissociation of parts. Testing was carried out at a speed of 50 miles per hour with increased loadings of (a) 790 lbs. for 8 hours, (b) 948 lbs. for 16 hours. (c) 1106 lbs. for 25 hours, (d) 1185 lbs. for 24 hours, (e) 1264 lbs. for 24 hours, (f) 1343 lbs. for 24 hours and (g) 1422 lbs. for 24 hours. These tires were found to be equivalent to or better than conventional commercial butadiene/styrene tires of similar construction not using the aerated cement of this invention.

What I claim is:
1. In an ethylene/propylene/nonconjugated diene copolymer tackified by:
 (a) uniformly mixing the copolymer with an organic cyclic resin having at least one polar functional group and a molarcular weight of at least 200 and selected from the group consisting of isoprenoid resins, terpenoid resins, and heat-insensitive phenolaldehyde resins;
 (b) aging the mixture in the substantial absence of an activating agent until a phase different from the bulk of the mixture forms on the surface of the mixture; and
 (c) exposing said surface to an activating agent to produce a peel tack which is at least one pound per linear inch more than the peel tack before the exposure, the improvement wherein ethylene/propylene/nonconjugated diene copolymer additionally contains 0.5 to 10 parts of an oil-soluble organic salt of a transition metal per 100 parts of copolymer, the salt being a naphthenate, linoleate, resinate or octoate of manganese, iron, cobalt, nickel, or copper to promote tack.

2. The product of claim 1 in which the activating agent is ultraviolet light in conjunction with air or oxygen.

3. The product of claim 1 in which the activating agent is air.

4. The product of claim 1 in which the ethylene/propylene/nonconjugated diene copolymer is an ethylene/propylene/1,4-hexadiene copolymer.

5. An ethylene/propylene/nonconjugated diene copolymer tackified by:
   (a) coating a surface of the copolymer with a cement prepared by mixing in a solvent solution about 5 to 25 weight percent solids of
      (1) an elastomeric ethylene/propylene/nonconjugated diene copolymer,
      (2) 1 to 100 parts of a polar organic cyclic resin having a molecular weight of at least 200 and selected from the group consisting of isophenoid resins, terpenoid resins, and heat-insensitive phenol-aldehyde resins per 100 parts of copolymer, and
      (3) 1 to 10 parts of an oil-soluble, organic salt of a transition metal per 100 parts of copolymer, the organic salt being a naphthenate, linoleate, resinate or octoate of manganese, iron, cobalt, nickel or copper;
   (b) drying the coated cement; and
   (c) exposing the dry cement to an activating agent.

6. The product of claim 5 in which the activating agent is air.

7. The product of claim 5 in which the activating agent is fluorescent light in conjunction with air or oxygen.

8. The product of claim 5 in which the ethylene/propylene/nonconjugated diene copolymer in the cement is an ethylene/propylene/1,4-hexadiene copolymer.

9. The product of claim 5 in which the activating agent is ultraviolet light in conjunction with air or oxygen.

10. An ethylene/propylene/nonconjugated diene copolymer tackified by:
    (a) coating a surface of the copolymer with a cement prepared by
       (1) mixing in a solvent solution about 5 to 25 weight percent solids of
          (i) an elastomeric ethylene/propylene/nonconjugated diene copolymer,
          (ii) 1 to 100 parts of a polar organic cyclic resin having a molecular weight of at least 200 and selected from the group consisting of isoprenoid resins, terpenoid resins, and heat-insensitive phenol-aldehyde resins per 100 parts copolymer, and
          (iii) 1 to 10 parts of an oil-soluble organic salt of a transition metal per 100 parts of copolymer, the organic salt being a naphthenate, linoleate, resinate or octoate of manganese, iron, cobalt, nickel or copper,
       (2) aerating the mixture; and
    (b) drying the coated cement.

11. The product of claim 10 in which the ethylene/propylene/nonconjugated diene copolymer in the cement is an ethylene/propylene/1,4-hexadiene copolymer.

References Cited

UNITED STATES PATENTS 3,354,107   11/1967   Hamed _____ 260—31.2

HOSEA E. TAYLOR, Primary Examiner

D. J. BARRACK, Assistant Examiner

U.S. Cl. X.R.

117—138.8, 161, 167; 260—23.5, 27, 33.6, 41, 80.78, 96, 844, 897